United States Patent Office 2,707,674
Patented May 3, 1955

2,707,674

PROCESS FOR ACTIVATING FURNACE BLACKS

Carl W. Sweitzer, Garden City, N. Y., assignor to Columbian Carbon Company, New York, N. Y., a corporation of Delaware No Drawing. Application November 25, 1952,
Serial No. 322,589

6 Claims. (Cl. 23—209.9)

This invention relates to the treating of furnace carbon blacks to effect a modification of their properties, especially with respect to oxygen content and pH characteristics.

The invention provides an improved method whereby the normally alkaline pH characteristics of furnace blacks may be made acidic, the oxygen content of the black materially increased and other desirable modification of the black effected by subjecting the blacks to mild oxidation without substantial loss in weight or reduction in particle size.

Various types of carbon blacks, notably those produced by the impingement processes and various modifications thereof, contain relatively large proportions of oxygen presumably chemically combined with the surfaces of the carbon particles. Carbon blacks produced by the channel process usually contain 4 to 8% of volatile matter, while those produced by the roller or drum impingement process may contain in excess of 12% of volatile matter, by weight.

The amount of volatile matter present in the carbon black may be determined by heating the black in the absence of air resulting in the driving off of the oxygen in the form of oxides of carbon ($CO$ and $CO_2$) together with smaller amounts of hydrogen, nitrogen, and sometimes oxides of sulfur. Where the total volatile matter exceeds 1% by weight and the oily matter present is less than say 0.5%, volatility is a good index to the percentage of combined oxygen on the surfaces of the carbon since the oxides of carbon always form the major portion of the volatiles.

For certain purposes, a high volatile content and, therefore, a high oxygen content, is a desirable characteristic of carbon blacks. It is known that the pH characteristic of a carbon black becomes more acidic as the volatile increases, reaching pH values as low as 2.5. Similarly, as the volatile increases, its ability to absorb alkali compounds from solutions increases, assuming that the particle size of the carbon remains constant.

Further, as the volatile increases, the curing of rubber compounds with which the carbon black has been compounded is generally retarded, the drying of paints, or the like, with which the carbon black has been mixed is also retarded, but the flow properties of ink containing the carbon black are enhanced. As to all of these properties, it has been established that the differences in the characteristics of the carbon black are due to the presence of oxygen on the carbon surfaces in the form of an acid radical, usually assumed to be a carboxyl radical.

Furnace carbons may be produced having many highly desirable characteristics, but they are notoriously deficient in volatile oxygen content for some purposes and previously proposed methods for oxidizing other blacks have been found generally unsatisfactory when applied to furnace blacks from the standpoint of efficiency, i. e., too high weight loss, and effectiveness, i. e., insufficient oxidation and insufficient lowering of the pH characteristic of the furnace blacks.

It has previously been proposed to add oxygen to the surfaces of carbon blacks, particularly impingement blacks, so as to increase their oxygen volatile content, by heating the carbon to a glowing, or burning, temperature with agitation in the presence of air for a brief period of time. Upon cooling, the carbon black has been found to have a materially increased volatile content, but the treatment has invariably resulted in material loss of the carbon black, running as high as 50% or higher by weight, due to burning of the carbon. Where furnace blacks are subjected to such treatment, the extent of oxidation of the black has been found to be insignificant and the process has invariably resulted in intolerably high losses by burning, even greater than the losses normally suffered in the oxidation of channel blacks.

I have found, however, that furnace blacks may be oxidized, i. e., activated, to such an extent as to develop pH characteristics as low as about 2.5, with no appreciable loss in weight, or reduction in particle size, by uniformly heating the black to an oxidizing, black heat temperature, i. e., an oxidizing temperature below that at which the particular black being treated will ignite under the prevailing conditions, and passing air or a mixture of air and steam in contact with the heated black.

I have further found that in order to effect this uniform heating of the furnace blacks to the above-indicated temperature, without encountering localized ignition or glowing temperatures, it is necessary that the black be heated in shallow beds not exceeding about ¼ inch in thickness.

The oxidation of furnace blacks, even at temperatures well below their ignition temperature, is an exothermic reaction. When these blacks are heated to an oxidizing temperature in beds of a thickness substantially in excess of ¼ inch in the presence of air, the heat liberated by the oxidation of the black in the interior of the bed is trapped within the interior of the body of black, by reason of the excellent heat-insulating properties thereof, and the temperature within the interior of the body of black quickly reaches the ignition temperature, as indicated by the glowing of the black beneath the surface of the bed. But I have found that when the black is so heated in beds not exceeding about ¼ inch in depth, the heat liberated by the oxidation is dissipated and carried off by the circulating air so that localized excessive temperatures are avoided.

For instance, five separate beds of the same furnace black, of ⅛ inch, ¼ inch, ⅜ inch, ½ inch and 1 inch thickness, respectively, were placed in an electrically heated oven and the oven heated to a uniform temperature of approximately 700° F., air being circulated over the several beds of black. During a 1¼ hours treating period, there was no visible glowing or incandescence of the surfaces of any of the respective beds of black. However, the black at the interior of the beds of ⅜ inch, ½ inch and 1 inch thickness was found to glow visibly and was definitely above its ignition temperature, even though the oven temperature was substantially below the ignition temperature of the particular black. There was no glowing or incandescence, whatever, of any portion of the black of the beds of ⅛ inch and ¼ inch thickness.

This same phenomena has been observed at over temperatures even as low as 600° F. Where the black is heated as a bed of a thickness substantially exceeding ¼ inch, the temperature of the interior portion of the beds rapidly builds up to a dull red heat, usually within 5 or 10 minutes, even though the oven temperature is well below the ignition temperature of the black.

Predicated upon these discoveries, the furnace black is, in accordance with my present invention, uniformly heated as a shallow bed, not exceeding about ¼ inch in thickness, to an oxidizing black heat temperature advantageously not lower than about 650° F., but necessarily below the temperature at which the particular black will ignite, while passing air or a mixture of air and steam over the surface of the bed of heated black. It is generally advantageous that the bed be of uniform thickness, but this is not essential so long as the heating is uniform and the stated maximum permissible bed depth is not exceeded.

Unlike prior methods for treating impingement blacks, I find that the furnace blacks must be heated only to temperatures in the black-heat range, no portion of the black exceeding such temperature. Temperatures well below the ignition temperature of the furnace carbon may be employed but, advantageously, the temperature should be only sufficiently below the ignition temperature to avoid glowing or bright spots. This temperature will vary somewhat with the particular furnace black treated and whether or not steam is admixed with the air. The maximum temperature possible without glowing of any portion of the black is usually most advantageous as the required treating time is thereby minimized. At temperatures below 650° F., the oxidation is usually intolerably slow. In general, where substantial proportions of steam are mixed with the air, e. g., 10–25% by volume, oxidizing temperatures approximately 50° F. higher than permissible with air alone may, with advantage, be employed.

In my study of many different furnace carbons, I have invariably found that the oxidizing temperature should not exceed 1,100° F., and usually should not exceed 1,000° F., if ignition of the carbon is to be avoided.

As above indicated, optimum treating time is largely dependent upon the treating temperature employed, the oxidation rate increasing with an increase in temperature, with a proportionate decrease in treating time. The optimum time factor for any particular furnace carbon at a given oxidizing temperature is readily determined by periodcially sampling the black being oxidized and testing the samples for pH characteristics. At maximum oxidation, the pH characteristics of the black will reach a minimum, usually about 2.5. In some instances the minimum attainable pH has been found to range as high as 3.5. When the minimum attainable pH value is reached, the treatment should be immediately discontinued for, if the period of treatment be continued beyond this point, loss in weight and other changes in the character of the furnace black will result. Under the operating conditions herein disclosed, the black may be fully oxidized without appreciable loss in weight.

The process is, with particular advantage, carried out by heating the black in an oven maintained at a temperature within the previously specified range, as a bed of a depth not exceeding about ¼ inch, held in a shallow tray while passing air, or a mixture of air and steam, over the bed of black. Other types of heating chambers may be used. The bed of black may be stationary, or may be caused to move slowly, continuously or intermittently, through the heating chamber. For instance, the black may be heated to the required temperature, while being passed through a heated tube, or other suitable heating chamber, as a uniform bed of the stated depth, air or a mixture of air and steam being passed through the tube over the surface of the black, advantageously in a countercurrent direction.

While the treatment, in accordance with my present process, should not be carried beyond the point where minimum pH characteristics are obtained if loss of weight is to be avoided, it will be understood that where furnace blacks having pH characteristics higher than the minimum are desired, the treatment may be discontinued when the required intermediate pH characteristics are obtained.

The ABC color change of a particular carbon black has been found to be a dependable index to changes in surface area, or particle size, by partial consumption in an oxidation treatment, such as herein described, whether carried out at a glowing temperature, in accordance with prior art processes, or at black-heat temperatures, in accordance with my present process. The ABC color property, just referred to, is determined by the method described in Rubber Age, August 1944, page 473. In general, an increase in the color index is indicative of an increase in surface area, a ten shade increase in blackness being considered roughly equivalent to one acre per pound increase in surface area.

Where my oxidation treatment is terminated as soon as the minimum obtainable pH for the particular black being treated is reached, no change in ABC color of the black is discernible. It will be understood that the minimum pH characteristics attainable, which is indicative of maximum oxidation of the surface of the black, will vary somewhat with different furnace blacks, as previously noted. Of the furnace blacks which I have treated by my present process, this minimum pH value generally lies between about 2.5 and 3.5.

As an illustration of the effectiveness of my process, I have activated a furnace black having an ignition temperature of 950°–1,000° F. by placing it as uniform beds of about ¼ inch depth in shallow trays in an oven maintained at a constant temperature of 900° F. and passing air by natural draft over the surface of the black. Samples of the black were periodically removed and tested for pH value. The original pH of the particular furnace black was 9.5. The duration of the treatment prior to taking the respective samples, the pH characteristics of the samples taken and the loss in weight of the black being treated are set forth in the following tabulation:

| Time (mins.) | pH | Percent Loss in Weight |
|---|---|---|
| 4 | 8.7 | 0 |
| 10 | 7.8 | 0 |
| 15 | 6.8 | 0 |
| 20 | 5.3 | 0 |
| 25 | 4.3 | 0 |
| 40 | 3.4 | 0 |
| 50 | 2.8 | 0 |
| 60 | 2.8 | 2.6 |
| 90 | 2.8 | 7.0 |
| 110 | 2.8 | 12.0 |

It will be observed that, in the first fifty minutes of treatment, the pH characteristic of the black was reduced from 9.5 to 2.8 and continued treatment did not further lower the pH characteristics beyond this value. Further, it appears that until this maximum oxidation was attained, there was no perceptible loss in weight, but immediately thereafter, a considerable loss in weight was experienced.

In the treatment of this particular black at 900° F., maximum oxidation was obtained in fifty minutes. With that particular black, the maximum oven temperature, while passing air alone over the black, was 900° F. and there was no localized glowing of the black during this treatment. By mixing steam with the air in proportions approximating 10–25 parts of steam to 90–75 parts of air, it was found possible to use oven temperatures as high as 950° F. and, under those conditions, maximum oxidation was obtained in about forty minutes, no localized glowing being observed.

Where lower temperatures are employed using air alone, considerably longer treating periods are required to attain the maximum oxidation, that is, minimum pH characteristics. For instance, operating at a temperature of 650° F., the maximum oxidation without loss in weight was obtained in seventeen hours. At 800° F., other conditions being the same, maximum oxidation was obtained in three hours. At 850° F., the maximum-oxidation period was reduced to 1½ hours.

In similarly treating another type of furnace carbon having an ignition temperature slightly in excess of 650° F., maximum oxidation was obtained in sixteen hours, using air alone at an oven temperature of 650° F.

In another run, a furnace black found to have an ignition temperature of about 1,000° F. in air was similarly heated in an oven at a temperature of 950° to 1,000° F., while passing a natural draft of air and steam over the heated black. Samples of the black being treated were taken periodically and tested for pH characteristics. Prior to the treatment, the black had a pH characteristic of 8.6. The sample taken after five minutes of treatment had a pH characteristic of 4.5 and that taken after 15 minutes of treatment had a pH characteristic of 3. For the first 15 minutes of treatment there was no loss in weight of the black. At the end of an additional 15 minutes of treatment, the pH characteristics of the black had been reduced to 2.5 and a loss in weight of 3.7% had been suffered. Also, some increase in color of the black was noted. It appears therefore that, for this particular black, the optimum treating time was somewhere between fifteen and thirty minutes and the minimum attainable pH value was 2.5.

A further furnace black having an ignition temperature of 900° F. was similarly heated in the presence of steam and air to a temperature of 850 to 900° F. and its pH value was reduced from a point substantially on the alkaline side to 3.3 in 61 minutes of treatment with a loss in weight of only 5.3%. It appears therefrom that the minimum attainable pH value for this black was 3.3 and that the optimum treating time under the indicated conditions was somewhat less than 61 minutes.

From the foregoing specific illustrations it appears that the minimum obtainable pH characteristic and the optimum treating time varies considerably with different furnace blacks and treating temperatures. However, I have found by extensive tests that the minimum pH value for any particular furnace black can be reached in accordance with my present invention with no perceptible loss in weight of the black.

These highly oxidized furnace blacks have been found to be extremely valuable for use in the manufacture of printing ink, where good flowing properties are desired. They are also useful as adsorbents and as intermediates in the preparation of other specialized carbon products.

This application is in part a continuation of my copending application Serial No. 80,571, filed March 9, 1949. Attention is also directed to the copending applications Serial Nos. 80,572 and 80,573, each filed March 9, 1949.

I claim:

1. Process for the activation of furnace blacks without substantial loss in weight and without substantial reduction in particle size which comprises uniformly heating a quiescent, shallow bed of the furnace black, of a thickness not exceeding about ¼ inch, to a black-heat temperature not lower than 650° F. but below the ignition temperature of the particular black, no portion of the bed of black being permitted to exceed a black-heat temperature, while passing air over, and in contact with, the surface of the bed of heated black, and continuing the treatment until the pH characteristic of the black has become acidic.

2. Process for the activation of furnace blacks without substantial loss in weight and without substantial reduction in particle size which comprises uniformly heating a quiescent, shallow bed of the furnace black, of a thickness not exceeding about ¼ inch, to a black-heat temperature not lower than 650° F., but below the ignition temperature of the particular black, no portion of the bed of black being permitted to exceed a black-heat temperature, while passing a mixture of air and steam over, and in contact with the surface of the bed of heated black, and continuing the treatment until the pH characteristic of the black has become acidic.

3. Process for the activation of furnace blacks without substantial loss in weight and without substantial reduction in particle size which comprises uniformly heating a quiescent, shallow bed of the furnace black, of a thickness not exceeding about ¼ inch, in a heating chamber maintained at a temperature not lower than 650° F., but below the ignition temperature of the particular black, no portion of the bed of black being permitted to exceed a black-heat temperature, while passing air over, and in contact with the surface of the bed of heated black, and continuing the treatment until the pH characteristic of the black has become acidic.

4. The process of claim 3 in which the heating chamber is heated to the maximum temperature possible without localized glowing and combustion of the furnace carbon.

5. Process for the activation of furnace blacks without substantial loss in weight and without substantial reduction in particle size which comprises uniformly heating a quiescent, shallow bed of the furnace black, of a thickness not exceeding about ¼ inch, in a heating chamber maintained at a temperature not lower than 650° F., but below the ignition temperature of the particular black, no portion of the bed of black being permitted to exceed a black-heat temperature, while passing air over, and in contact with, the surface of the bed of heated black, continuing the treatment until minimum pH characteristic of the black within the range of about 2.5 to about 3.5 has been obtained and then immediately discontinuing the treatment.

6. Process for the activation of furnace blacks without substantial loss in weight and without substantial reduction in particle size which comprises uniformly heating a quiescent, shallow bed of the furnace black, of a thickness not exceeding about ¼ inch, in a heating chamber maintained at a temperature not lower than 650° F., but below the ignition temperature of the particular black, no portion of the bed of black being permitted to exceed a black-heat temperature, while passing a mixture of air and steam over, and in contact with, the surface of the bed of heated black, and continuing the treatment until the pH characteristic of the black has become acidic.

References Cited in the file of this patent

UNITED STATES PATENTS

| | | |
|---|---|---|
| Re. 19,664 | Damon | Aug. 13, 1935 |
| 2,342,862 | Hemminger | Feb. 29, 1944 |
| 2,393,106 | Johnson et al. | Jan. 15, 1946 |
| 2,486,205 | Prosk | Oct. 25, 1949 |

OTHER REFERENCES

Johnson: "Industrial Engineering Chemistry," vol. 21, No. 12, December 1929, pages 1288–1290.

Sweitzer et al.: "The Rubber Age," vol. 55, No. 5, August 1944, pages 469–478.